Aug. 12, 1969  R. J. DEMAISON  3,460,933
METHOD OF CONCURRENTLY OPERATING FURNACES OF THE
ACID OR BASIC CONVERTER TYPES
Filed Aug. 1, 1967  2 Sheets-Sheet 1
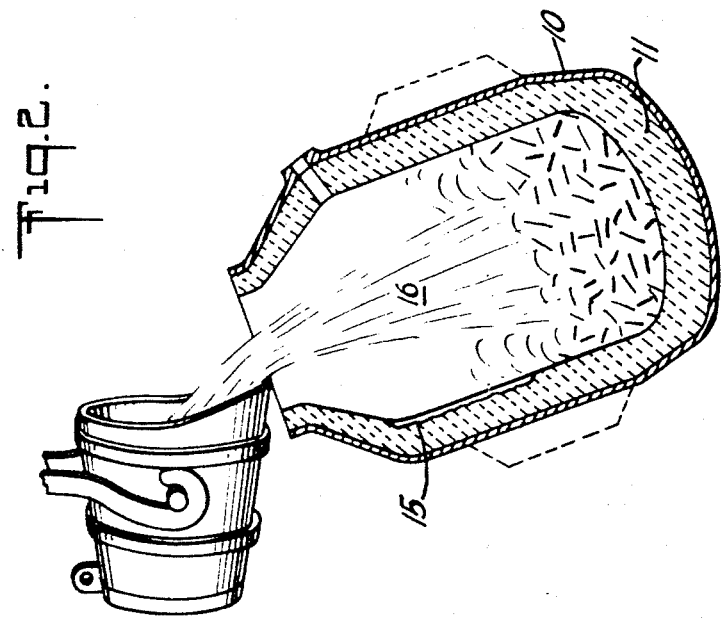
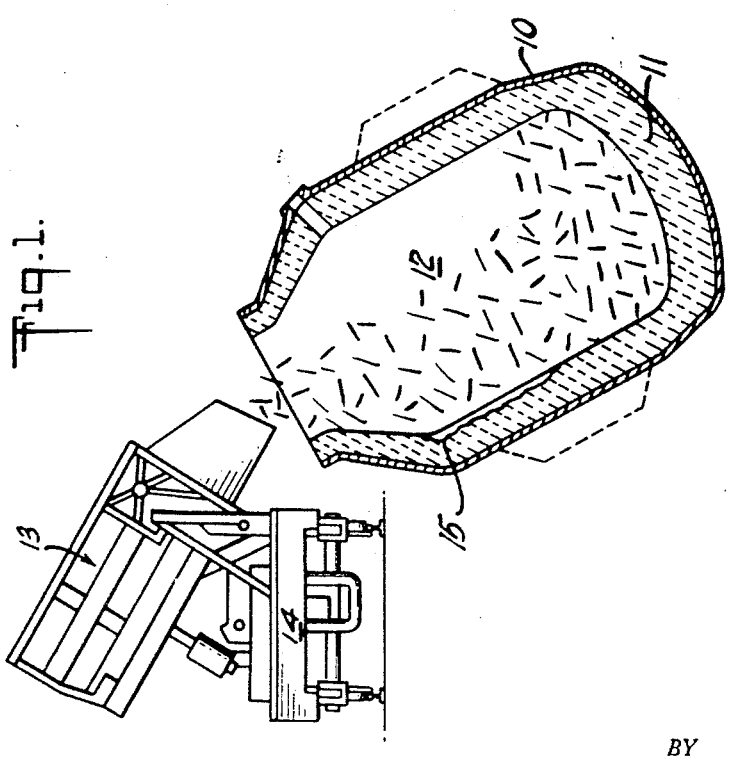
INVENTOR:
R.J. DEMAISON
BY
Morrison, Kennedy & Campbell
ATTORNEYS.

Aug. 12, 1969   R. J. DEMAISON   3,460,933
METHOD OF CONCURRENTLY OPERATING FURNACES OF THE
ACID OR BASIC CONVERTER TYPES
Filed Aug. 1, 1967   2 Sheets-Sheet 2
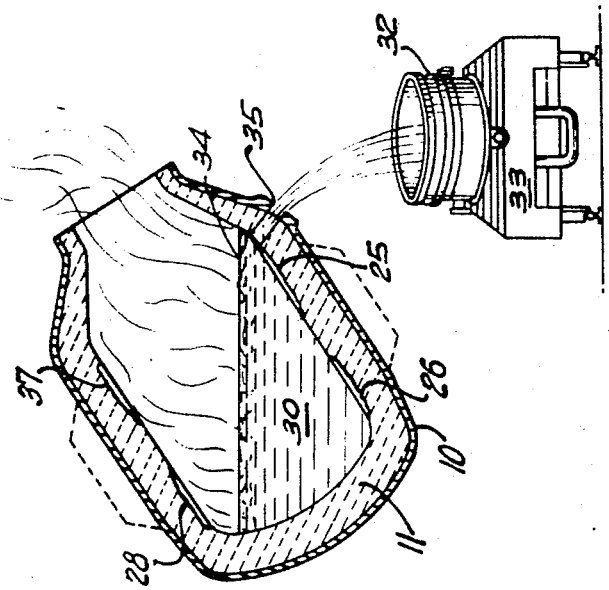
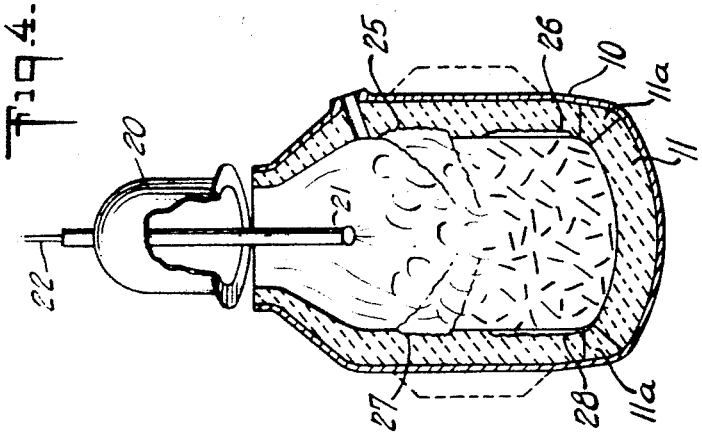
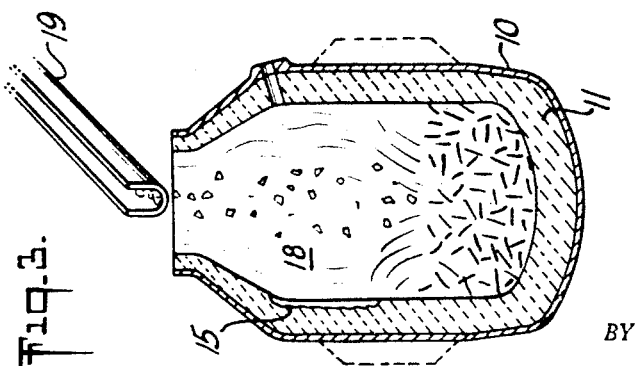
INVENTOR:
R. J. DEMAISON
BY
Morrison, Kennedy & Campbell
ATTORNEYS

United States Patent Office 3,460,933
Patented Aug. 12, 1969

3,460,933
METHOD OF CONCURRENTLY OPERATING FURNACES OF THE ACID OR BASIC CONVERTER TYPES
Raymond J. Demaison, Fleetwood, Mount Vernon, N.Y., assignor to Quigley Company, Inc., a corporation of New York
Continuation-in-part of application Ser. No. 424,071, Jan. 7, 1965. This application Aug. 1, 1967, Ser. No. 657,620
Int. Cl. C21b; C21c
U.S. Cl. 75—20              6 Claims

ABSTRACT OF THE DISCLOSURE

Two furnaces are operated concurrently in three different stages, A, B and C, with stage A of one furnace coinciding with stage C of the other furnace and with stage B of one furnace coinciding with the relining of the other furnace. Each furnace in stage A and in stage C is operated on a programmed schedule of a series of steel producing periods involving a plurality of consecutive heats and a series of idle periods of slightly less duration and involving no steel producing heats.

---

This is a continuation-in-part of my application Ser. No. 424,071, filed Jan. 7, 1965, now Patent No. 3,351,460.

This earlier application is directed to a method for prolonging the life of the refractory linings of high temperature furnaces of the acid or basic oxygen converter type, which consists in operating two furnaces concurrently according to a programmed schedule which will insure a substantially constant maximum daily steel production at least equal substantially to the maximum daily steel producing capacity of one furnace when operated alone and which comprises the steps of operating one of said furnaces at a substantially maximum number of steel producing heats per day while the other one of said furnaces is being relined, and likewise operating the latter furnace after relining at a substantially maximum number of steel producing heats per day while the former furnace is being relined, and in the periods between the relining operations operating the two said furnaces alternately, one at a less than maximum number of steel producing heats per day, and the other also at a less than maximum number of steel producing heats per day, the total number of steel producing heats per day of both furnaces being at least equal substantially to the maximum number of heats per day of one furnace alone, and during said intervening periods between the relining operations, while the furnaces are temporarily out of steel producing operation but still maintained at or near steel operating temperature, spraying upon the linings of the two said furnaces a series of protective coatings of refractory material in amounts sufficient to prevent failure of said linings while the furnaces are in steel producing operation, the spraying operations upon the lining of one furnace being carried out during the steel producing operations of the other furnace.

As a result of such method, the life of the lining of each furnace is greatly prolonged and moreover the total number of steel producing heats of both furnaces is greatly increased.

According to the instant invention, the same general method as above described is followed except that the lining spraying operations are omitted. This will mean a much shorter life for the furnace linings but the total number of steel producing heats of the two furnaces will be greater than can be obtained when operating one furnace alone.

As in the parent application, the operation of an individual furnace will be carried out in three stages. Taking as a specific example a furnace which is capable of producing 27 heats per day as a maximum when operated alone in a 24 hour three-shift schedule, the operation of the furnace will be as follows:

A. During an initial stage (e.g. 6 days), the furnace will be operated at less than its maximum daily capacity (27 heats) but at approximately one half (plus or minus) of its maximum daily capacity (e.g. 11 to 15 heats per day).

B. During an intermediate stage (e.g. 5 days), the furnace will be operated at its maximum daily capacity, i.e. 27 heats per day.

C. During a third or final stage (e.g. 6 days), the furnace will be operated to produce approximately the same number of heats per day as in stage A, namely, 11 to 15 heats, but preferably at one half of its maximum daily capacity.

In this way, assuming that the life of the furnace lining when operated under the conditions stated is 17 days, the total number of heats produced by the furnace will be 315. And assuming that the life of the lining when the furnace is operated under normal conditions (that is to say, at its maximum daily production of 27 heats) is approximately 11½ days, the total number of heats produced by the furnace will likewise be 315. Thus, the furnace when operated pursuant to the programmed schedule set forth above will produce during the life of the furnace lining at least the total number of heats that the furnace could produce when operated at its maximum daily capacity.

By operating two furnaces concurrently each according to the above procedure but pursuant to a programmed schedule in which stage A of one furnace coincides with stage C of the other furnace and in which stage B of one furnace coincides with the relining of othe other furnace, increased steel tonnages may be obtained from the two furnaces on a yearly basis, as will later be explained.

Before proceeding with the description of the operation of the furnaces, it might be well to explain the steps followed in the normal production of steel in these types of furnaces. They are as follows:

| Step No.— | Approx. time, min. |
|---|---|
| 1. Charging furnace with scrap and hot metal | 2–15 |
| 2. Oxygen blowing, including lance insertion and removal | 20–25 |
| 3. Temperature and analysis check | 8–11 |
| 4. Tapping time | 6–15 |
| 5. Slag removal | 1–5 |
| Total time for heat | 37 to 80 |

In the operation of two furnaces according to a programmed schedule, each furnace is operated in partly overlapping time periods to produce let us say two consecutive heats per period, each of which may be assumed to take slightly less than one hour from loading to tapping. A normal crew is used and the first heat in any one time period is produced by the use of the full crew, and then the second heat in that period is started and blown with oxygen by the use of the full crew. After temperature and composition checks, a part of the crew working on one furnace goes over to the other furnace and proceeds to load it with scrap and hot metal while the rest of the crew stays with the first furnace until the molten metal is tapped into the ladle and the slag is removed. In operating in this manner and shifting the crew back and forth between the two furnaces, it is possible to save from 10 to 15 minutes in the second heat of each steel producing period, so that at the end of 24 hours a 10 minute gain for a 2-heat steel producing period will give 3 extra heats.

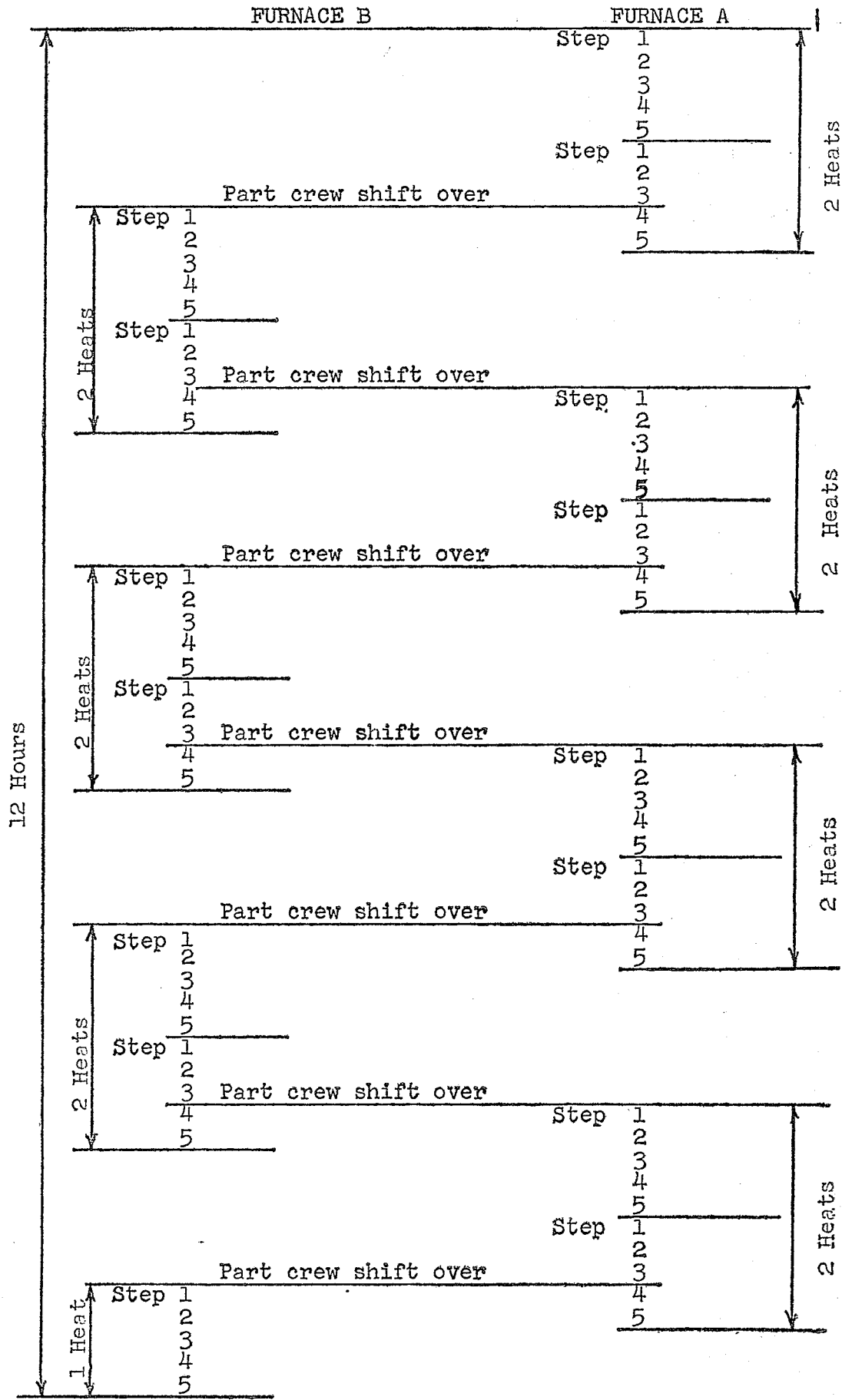

The above table, which is based on the operation of two furnaces for 12 hours and will be extended to cover 24 hours, will make the invention entirely clear.

Furnace A will be operated for 2 consecutive heats by following the 5 steps set forth above for each heat. Near the end of the second heat, namely, after the completion of step 3, part of the crew will shift over to furnace B (which has been idle up to this time) and put it into operation for 2 consecutive heats. The rest of the crew will later shift over to furnace B after it has completed steps 4 and 5 in the operation of furnace A. Near the end of the second heat of furnace B, namely, after the completion of step 3 in that heat, part of the crew which has been attending furnace B will shift back to furnace A (which has been idle during that steel producing period of furnace B) to put it into operation for the next 2 consecutive heats, the remaining part of the crew staying with furnace B until it has completed steps 4 and 5 in the operation of furnace B. By thus shifting the crew back and forth from furnace to furnace throughout a 24 hour period, furnace A will produce 16 heats and furnace B 14 heats or a total of 30 heats, which is three more heats than can be produced by one furnace when operated alone. It will be noted that when one furnace is in operation for 2 consecutive heats, the other furnace is idle for the major part of that particular steel producing period and may itself be said to be in a non-steel producing period, being maintained at or near the full operating temperature of the furnace to keep it in condition for the next steel producing operation.

It is pointed out that by operating each furnace according to the above table, that is to say on a programmed schedule of a series of steel producing periods with intervening non-steel producing periods of slightly less duration, an early deterioration of the furnace linings (such as would occur by continuous operation of the furnaces) will be prevented. In other words, the furnace linings will be heated at a controlled rate and due to the possibility of varying the steel producing periods the amount of heat input can be extended to a considerable extent. As a result, for instance, the establishment of a state of thermal equilibrium will be presented until the end of the initial stages of operation of the furnaces and similar benefits will occur but in less degree during the final stages of operation of the furnaces.

The following is an illustration of a program developed to carry out the invention:

Start with a new refractory lining in one furnace and proceed with a programmed schedule worked out for the number of furnaces being operated simultaneously. The schedule is to be so arranged as to always run one furnace to supply a maximum daily tonnage of steel while another furnace is being relined, and operate the two furnaces simultaneously in initial and final stages to produce a total of 30 heats per day. A typical programmed schedule of operation will be as follows:

| Cycling Days | New Furnace A Cumulative total of heats produced per day | Old Furnace B Cumulative total of heats produced per day | Total number of heats produced on Both Furnaces per day |
|---|---|---|---|
| | Initial Stage A: | Final Stage C: | |
| Day #1 | 15 | 240 | 30 |
| Day #2 | 30 | 255 | 30 |
| Day #3 | 45 | 270 | 30 |
| Day #4 | 60 | 285 | 30 |
| Day #5 | 75 | 300 | 30 |
| Day #6 | 90 | 315 | 30 |
| | Intermediate Stage B: | | |
| Day #1 | 117 | Reline | 27 |
| Day #2 | 144 | do | 27 |
| Day #3 | 171 | do | 27 |
| Day #4 | 198 | do | 27 |
| Day #5 | 225 | do | 27 |
| | Final Stage C: | Initial Stage A: | |
| Day #1 | 240 | 15 | 30 |
| Day #2 | 255 | 30 | 30 |
| Day #3 | 270 | 45 | 30 |
| Day #4 | 285 | 60 | 30 |
| Day #5 | 300 | 75 | 30 |
| Day #6 | 315 | 90 | 30 |

Taking a total of 30 heats per day for both furnaces when operated 6 consecutive days in stage A of furnace A and stage C of furnace B and taking 27 heats per day for 5 consecutive days of operation in stage B of furnace A and the reline period of furnace B, we have a total of 315 heats produced in 11 days, giving an average of 28.6 heats per day for the two furnaces. Using this daily average of 28.6 heats per day and multiplying by 365 days per year, we obtain 10,439 heats as the total number of heats produced by the two furnaces in a one year period.

Using the average daily production of 27 heats per day for two furnaces operating singly and multiplying it by 365 days per year, we obtain 9,885 heats per year as the total yearly production for the two singly operated furnaces.

Then subtracting 9,855 heats from 10,439 heats, we obtain 584 heats more per year produced by the instant invention than could be produced by operating the two furnaces singly. Let us now take the 584 extra heats and assume that each heat is 200 tons, we will have produced 116,800 more tons of steel per year.

The programmed schedule of operation can be laid out when the following facts have been ascertained by actual furnace operation.

(1) Know the average number of heats per campaign that could be produced by single furnace operation.

(2) Know the number of days necessary to reline the furnace.

(3) Know the maximum number of heats that can be produced per day by single furnace operation.

(4) Assume the maximum number of steel producing and non-steel producing periods of operation of two furnaces that can be obtained per day and from this the maximum number of heats per day that can be attained.

On the basis of the above facts, it will be possible to lay out a programmed schedule which will give the maximum daily number of heats for the greatest yearly steel tonnage.

It can now be readily seen how two, three or even more furnaces can be operated on a programmed schedule to produce greater steel tonnages per day than could be obtained by operating one furnace alone in the case of a two-furnace operation or two furnaces together in the case of a three-furnace operation.

In the accompanying drawings:

FIG. 1 is a cross sectional view of a basic oxygen furnace of the Linz-Donowitz type in a position tilted to the left for charging with steel scrap;

FIG. 2 is a cross sectional view of the furnace shown in FIG. 1 in the same tilted position but showing the addition of the hot molten iron;

FIG. 3 is a cross sectional view of the furnace shown in FIG. 1 but in a vertical position for the adding of slag forming materials, such as powdered limestone, etc.;

FIG. 4 is a cross sectional view of the furnace shown in FIG. 3 in a vertical position for blowing with oxygen and showing the water-cooled hood and oxygen lance; and FIG. 5 is a cross sectional view of the furnace shown in FIG. 4 but in a position tilted to the right for pouring the molten steel into a ladle.

Referring to FIG. 1 in particular, the furnace 10 with its lining 11 is tilted at a suitable angle for loading the steel scrap 12 thereinto from the body 13 mounted on the car 14. It will be noticed that the lining 11 of the furnace will be seriously abraded on the loading side as indicated at the area 15, thus giving rise to the first area of wear on the lining. In some instances abrasion resistant bricks are installed in this area to keep this abrasion to a minimum amount.

FIG. 2 shows the hot molten iron 16 being poured over the scrap 12 from the ladle 17. There is little or no abrasion or erosion from the addition of the hot metal as it is poured over the strap.

FIG. 3 shows the addition of the slag forming materials, such as powdered limestone 18, from the overhead chute 19. Here again there is little or no erosion or abrasion from the limestone, since it is in fine grained form.

FIG. 4 shows the furnace fitted with the water-cooled hood 20 which is equipped with a duct for leading the hot gases into a suitable precipitator for removing the solid particles contained therein. The hood 20 is fitted with the oxygen lance 22 so arranged as to blow the oxygen downwardly onto the molten metal and scrap. The shell 21 of said lance is arranged for the circulation of cold water therethrough to thus protect said lance against deterioration from the high heat developed in the furnace. In this operation, due to the high heats encountered and the boiling action of the hot metal and slag therein, there is a definite wear pattern established. Thus, the lining 11 of the furnace 10 is eroded at four definite areas as indicated at 25, 26, 27 and 28, and, strangely enough, the wear pattern at 25 and 27 is not always in circumferential form but occurs at 2, 4, 8 and 10 o'clock positions on a section taken through the furnace with the smaller included angles being on the center line of the tilting mechanisms. The wear patterns at 25 and 27 do not occur in a vertical line but are inwardly inclined and are caused by the hot metal and slag when the furnace is in the tilted position. There is also a serious wear pattern established at 11a at the knuckle where the bottom lining and cylindrical wall lining are separated and the space therebetween is rammed with suitable material.

In this type of furnace, there is no rotation but only the tilt, so that there can be no confusion as to the position of the wear patterns. The wear pattern at 26 and 28 more or less is a continuous circumferential wear pattern as long as furnace operation variables are held constant and is caused by the erosion and spalling under the high temperatures encountered during the blowing period. In this type of conversion of iron to steel, it is not unusual to tap a heat in from 50 to 60 minutes from time of starting to load with scrap and hot metal, which fact definitely indicates that there is a much greater movement of the hot metal taking place in the furnace than would be encountered in an open hearth furnace.

FIG. 5 shows the molten metal 30 being poured into the ladle 32 resting on the car 33. The furnace is tilted so that the slag line 34 remains above the tap hole opening 35 to thus prevent the pouring of any of the slag out of the furnace with the steel. The complete pouring and emptying of the furnace is accomplished by simply tilting the furnace a little more until all the metal has run out. In some instances, cold water is sprayed on the slag to congeal it before pouring to insure that no slag is poured. Here again there is little or no erosion taking place in the furnace proper but there is considerable erosion of the tap hole which necessitates its repair quite often in order to insure proper pouring of the heat.

The foregoing description of the operation of furnaces in a programmed schedule of steel producing and non-steel producing operations will allow one to see how the instant invention will permit greater amounts of steel to be produced daily notwithstanding the lack of spraying to protect the furnace linings in the wear areas.

What is claimed is:

1. A method of operating two furnaces of the acid or basic oxygen converter type to obtain maximum steel tonnages from the furnaces during any one campaign without spraying protective coatings on the linings of the furnaces, which comprises the steps of operating one of said furnaces at a substantially maximum number of steel producing heats per day while the other one of said furnaces is being relined, and likewise operating the latter furnace after relining at a substantially maximum number of steel producing heats per day while the former furnace is being relined, and in the stages between the relining operations operating the two furnaces, each at a less than maximum number of steel producing heats per day, and in such sequence that steel producing periods of one furnace are partly overlapped by steel producing periods of the other furnace.

2. A method according to claim 1, wherein one furnace after being relined is first operated at a substantially less than maximum number of steel producing heats per day and later, after being operated during the relining period of the other furnace at the maximum number of steel producing heats per day, is also operated at a substantially less than maximum number before itself being relined.

3. A method according to claim 1, wherein each steel producing period of the two furnaces when operated produces two consecutive heats.

4. A method according to claim 1, wherein each steel producing period of the two furnaces when operated produces two consecutive heats, and wherein the first heat of each said steel producing period of one furnace is started before the end of the second heat of the preceding steel producing period of the other furnace.

5. A method of operating three furnaces of the acid or basic oxygen converter type to obtain maximum steel tonnages from the furnaces during any one campaign without spraying protective coatings on the linings of the furnaces, which comprises the steps of operating two furnaces simultaneously each at a substantially maximum number of steel producing heats per day while a third furnace is being relined, then repeating this step for the relining of each of the other furnaces, and in the stages between the relining operations operating the three furnaces, each at a less than maximum number of steel producing heats per day, and in such sequence that steel producing periods of one furnace are partly overlapped by steel producing periods of another furnace.

6. A method according to claim 5, wherein any one furnace after being relined is first operated at a substantially less than maximum number of steel producing heats per day and later, after being operated during the relining period of another furnace at the maximum number of steel producing heats per day, is also operated at a substantially less than maximum number before itself being relined.

References Cited

UNITED STATES PATENTS

| | | | |
|---|---|---|---|
| 405,392 | 6/1889 | Bertrand | 75—20 |
| 2,831,467 | 4/1958 | Guczky | 75—60 X |
| 3,331,681 | 7/1967 | Mobley | 75—60 |
| 3,351,460 | 11/1967 | Demaison | 75—60 |
| 3,301,664 | 1/1967 | Hall | 75—43 X |

L. DEWAYNE RUTLEDGE, Primary Examiner

G. K. WHITE, Assistant Examiner

U.S. Cl. X.R.

75—43, 60

PO-1050
(5/69)

UNITED STATES PATENT OFFICE
CERTIFICATE OF CORRECTION

Patent No. 3,460,933     Dated August 12, 1969

Inventor(s) Raymond J. Demaison

It is certified that error appears in the above-identified patent and that said Letters Patent are hereby corrected as shown below:

Column 2, line 35, for "othe" read -- the --; column 5, line 42, for "presented" read -- prevented --; column 6, line 14, for "9885" read -- 9855 --; and column 6, last line, for "strap" read -- scrap --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents

Disclaimer 3,460,933.—*Raymond J. Demaison*, Fleetwood, Mount Vernon, N.Y. METHOD OF CONCURRENTLY OPERATING FURNACES OF THE ACID OR BASIC CONVERTER TYPES. Patent dated Aug. 12, 1969. Disclaimer filed Mar. 19, 1970, by the assignee, *Quigley Company, Inc.*

Hereby disclaims the terminal portion of the term of the patent subsequent to Nov. 7, 1984.

[*Official Gazette August 18, 1970.*]